(12) United States Patent
Macor

(10) Patent No.: US 7,047,038 B1
(45) Date of Patent: May 16, 2006

(54) COMPUTER AND MOBILE COMMUNICATION SYSTEM

(75) Inventor: James J. Macor, Jackson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/353,316

(22) Filed: Jul. 14, 1999

(51) Int. Cl.
H04M 1/00 (2006.01)

(52) U.S. Cl. .............................. 455/556.1; 455/550.1; 455/557; 455/575.3

(58) Field of Classification Search ................ 455/90, 455/575, 550, 556, 419, 418, 557, 550.1, 455/553.1, 556.1, 556.2, 90.3, 575.1, 575.3, 455/575.8, 90.1; 329/56, 110, 58; 340/825.44, 340/7.1, 7.22; 345/156, 169.1, 168, 901, 345/90.3, 95, 566; 379/428.01, 428.04, 433.01, 379/433.02, 433.04; 361/680–682, 686
See application file for complete search history.

(56) References Cited

U.S. PATENT DOCUMENTS

| 5,020,090 A | * | 5/1991 | Morris ........................ 379/56 |
| 5,189,632 A | * | 2/1993 | Paajanen et al. ............ 379/110 |
| 5,297,192 A | * | 3/1994 | Gerszberg ................... 455/419 |
| 5,337,346 A | * | 8/1994 | Uchikura .................... 455/556 |
| 5,410,333 A | * | 4/1995 | Conway ...................... 345/169 |
| 5,515,305 A | * | 5/1996 | Register et al. ............. 708/145 |
| 5,533,097 A | * | 7/1996 | Crane et al. .................. 379/58 |
| 5,577,100 A | * | 11/1996 | McGregor et al. .......... 455/406 |
| 5,625,673 A | * | 4/1997 | Grewe et al. ................. 379/58 |
| 5,648,760 A | | 7/1997 | Kumar |
| 5,664,228 A | * | 9/1997 | Mital ......................... 235/380 |
| 5,719,936 A | * | 2/1998 | Hillenmayer ............... 379/447 |
| 5,724,655 A | * | 3/1998 | Grube et al. ................ 455/419 |
| 5,748,895 A | * | 5/1998 | Shiff et al. .................. 359/109 |
| 5,768,163 A | * | 6/1998 | Smith, II .................... 708/105 |
| 5,797,089 A | * | 8/1998 | Nguyen ...................... 455/403 |
| 5,814,798 A | * | 9/1998 | Zancho ....................... 235/380 |
| 5,825,873 A | * | 10/1998 | Duncan et al. ............. 379/419 |
| 5,878,282 A | * | 3/1999 | Mital ......................... 235/492 |
| 5,884,186 A | * | 3/1999 | Hidaka ....................... 455/550 |
| 5,907,815 A | * | 5/1999 | Grimm et al. .............. 455/575 |
| 5,929,774 A | * | 7/1999 | Charlton ..................... 455/556 |
| 5,949,643 A | * | 9/1999 | Batio .......................... 361/681 |
| 5,978,591 A | * | 11/1999 | Bartholomew et al. ....... 707/11 |
| 5,983,073 A | * | 11/1999 | Ditzik ........................ 455/11.1 |
| 5,991,594 A | * | 11/1999 | Froeber et al. ............. 434/317 |
| 6,034,621 A | * | 3/2000 | Kaufman ................ 340/825.44 |
| 6,035,221 A | * | 3/2000 | Snyder et al. .............. 455/569 |
| 6,067,583 A | * | 5/2000 | Gilbert ........................... 710/8 |
| 6,073,031 A | * | 6/2000 | Helstab et al. .............. 455/557 |

(Continued)

FOREIGN PATENT DOCUMENTS

GB 2275120 A * 8/1994

Primary Examiner—Charles N. Appiah
(74) Attorney, Agent, or Firm—Birch, Stewart, Kolasch & Birch, LLP

(57) ABSTRACT

A computer and mobile communication system for performing wireless telephone, personal organizer and/or schedule alert functions is provided. The system may have a wireless handset for recording and playing messages, and for performing scheduling functions. The computer may be located in a base station with a common housing which contains a cradle to provide a conduit for exchange of information between the computer and the handset, as well as the circuitry to charge a battery in the handset. The handset may be switched between a telephone mode and a personal organizer mode by opening and closing a protective cover. A method of operating the system is also disclosed.

18 Claims, 4 Drawing Sheets

U.S. PATENT DOCUMENTS

| | | | |
|---|---|---|---|
| 6,107,988 A * | 8/2000 | Phillipps | 345/156 |
| 6,128,661 A * | 10/2000 | Flanagin et al. | 709/217 |
| 6,149,442 A * | 11/2000 | Enright | 439/10 |
| 6,157,982 A * | 12/2000 | Deo et al. | 709/212 |
| 6,209,011 B1 * | 3/2001 | Vong et al. | 708/112 |
| 6,259,932 B1 * | 7/2001 | Constien | 455/556 |
| 6,297,752 B1 * | 10/2001 | Ni | 341/22 |
| 6,577,496 B1 * | 6/2003 | Gioscia et al. | 361/681 |
| 6,587,675 B1 * | 7/2003 | Riddiford | 455/557 |
| 6,850,780 B1 * | 2/2005 | Gioscia et al. | 455/566 |

\* cited by examiner

COMPUTER AND MOBILE COMMUNICATION SYSTEM

BACKGROUND OF THE INVENTION

1. Field of the Invention

The present invention relates generally to communications, communication devices, and computers. More specifically, the invention relates to an integrated system which performs wireless telephony and personal computing functions. The system may include an interactive personal organizer for maintaining directories and calendars, and for generating and storing documents. The invention also relates to a system for transmitting executable instructions from a computer to a wireless telephone.

2. Description of the Related Art

Computers and telephones are useful tools for efficiently performing work in the modern workplace. Very often, both are found in close proximity to one another, whether that workplace be the office or the home. Furthermore, many individuals maintain stand alone portable personal organizers to assist them in retaining and recalling telephone lists, meeting times, calendars and other data.

In recent years, there has been increasing use of compact, pocket-size electronic personal organizers that store personal scheduling information such as appointments, tasks, phone numbers, flight schedules, alarms, birthdays, and anniversaries. Some of the more common electronic organizers are akin to hand-held calculators. They have full input keyboards with alphanumeric keys, as well as special function keys. The organizers also have liquid crystal displays (LCD) which may be used to display full text sentences and rudimentary graphics.

Apart from personal organizers, it is also known to maintain appointment calendars and task lists on desk-top personal computers. Thus, people who electronically maintain their schedules often enter the same information two different times: once into a personal computer and once into a portable personal organizer. This repetitive effort is inconvenient and affords opportunity for error. Additionally, there is a risk of incorrectly entering conflicting schedules.

Furthermore, a portable organizer may not provide telephone or adequate personal computer functions. The portable organizer may not be able to interface with a telephone or a personal computer. Thus, the work space clutter is compounded because one may still need a telephone and a personal computer alongside the mobile organizer. Furthermore, when an individual leaves the work station, he or she may have to carry both a personal organizer and a mobile phone. Finally, because the keys on a portable personal organizer may be relatively small, data entry may be difficult or cumbersome. Accordingly, it would be desirable for a handset to function both as a mobile phone and as a personal organizer, thus eliminating the need for carrying multiple devices.

In addition, it would be desirable to provide convenient data transfer between the personal organizer and the computer workstation, to facilitate data entry and retrieval. That is, there is a need in the art for a system that provides for a single entry of scheduling and other organizer data that can be read subsequently by both the computer and the portable organizer device.

One approach to accomplishing automatic data transfer is to interconnect the computer and personal organizer using a physical cord or conductor. For instance, a serial RS232 cable can be used to connect the serial port of the computer with a specially configured I/O port on the personal organizer. In this manner, data entered into the computer can be electronically transferred to the personal organizer over the cable. While this system might reduce the opportunity for entry error, it would be inconvenient because the user must either carry a cable along with the personal organizer or leave the cable with the computer and only load information from that computer.

Accordingly, there is a need in the art for a wireless communication system that is not reliant on a cable interface. In addition, there is a need for a system for downloading data from a computer to a mobile phone/electronic personal organizer which is easy to use, convenient, and capable of wide use.

SUMMARY OF THE INVENTION

The present invention provides a convenient and easy-to-use wireless communication device, such as a mobile phone, having a built-in personal organizer unit. The organizer unit may have means for exchanging data and executable instructions with a stand alone computer through the use of conventional memory drives. Such memory drives are widely available in computers, enabling the present invention to be practiced without special adapters or cords.

The computer base station may store a personal organizer program that is interactive with the personal organizing system of the wireless communication device. Both personal organizers may be provided with user computing functions such as directories, calendars and memo writing capabilities. Base station personal organizer information may be downloaded to the handset on-board personal organizer for system interaction at a location remote from the computer base station. The full size monitor and keyboard for the base station is the preferred user interface for programming personal organizer features from an ergonomics view point when the user is at the computer base station. However, information from the base station computer can be downloaded to the wireless handset which provides the user with mobility when needed. Thus, the handset may perform typical mobile telecommunication functions and also personal organizer functions that are either programmed at the computer base station or at the handset.

According to another aspect of the invention, the base station computer may be arranged to send a signal to the wireless handset which activates an audible alert sound in the handset to notify the user of a scheduled meeting or event. This feature may be programmed at the computer base station for practical ergonomic reasons. Thus, a software program stored at the computer base station may be selectively programmed by the user to send a signal which would activate an audible alert sound to notify the user of an event with a time sensitive nature. Programming the alert function into the handset may also be provided as an option.

The alert feature may be activated for transmission from the base station by a sensing switch located on the base station charging cradle. In the event the handset is not in the cradle, the system may detect this condition and transmit a signal to activate the audible alert on board the wireless handset. In a preferred embodiment of the invention, the signal would be transmitted based upon the user-programmed information and time table of events in the personal organizer software at the computer base station.

Thus, the present invention relates to an integrated computer and mobile communication system, which has a computer base station and a separate mobile (or portable) device. The mobile device may be provided with a wireless telephone unit and a personal organizer unit, and additional features may be provided if desired. In addition, a data transfer system may be provided for transferring data from the computer base station to the mobile device and vice versa. The mobile device may be sized to be held and operated in the user's hand.

According to a preferred embodiment of the invention; the base station may be ergonomically configured with a keyboard for entering organizer data and operating a variety of programs, a monitor for displaying organizer information and other information and graphics, and suitable operating system software. In addition, the base station may have a cradle for receiving the handset in a convenient angled position adjacent the monitor. The telephone speaker may be arranged to face the user (that is, facing in the same direction as the monitor) to operate as a speakerphone, if desired. The cradle may have electrical nodes for charging batteries in the handset, and the same nodes may also be used as signal lines for transferring data to and from the handset.

According to another aspect of the invention, digital data transfer may be accomplished by suitable radio frequency units and antennae located on or within the base station and the handset.

According to yet another aspect of the invention, the mobile device may be provided with a display screen and a hinged cover for protecting the screen. The cover may be connected to a hinge switch for operatively controlling the handset, if desired.

According to another aspect of the invention, an audible alert may be provided by the handset based on data received from the work station. The data may be transferred via electrical conductors while the handset is located on the workstation or via wireless communication devices when the handset is removed from the base station.

BRIEF DESCRIPTION OF THE DRAWINGS

These and other advantages and features of the invention will be more clearly understood from the following detailed description provided in connection with the accompanying drawings in which.

DETAILED DESCRIPTION OF PREFERRED EMBODIMENTS

Figure 1:
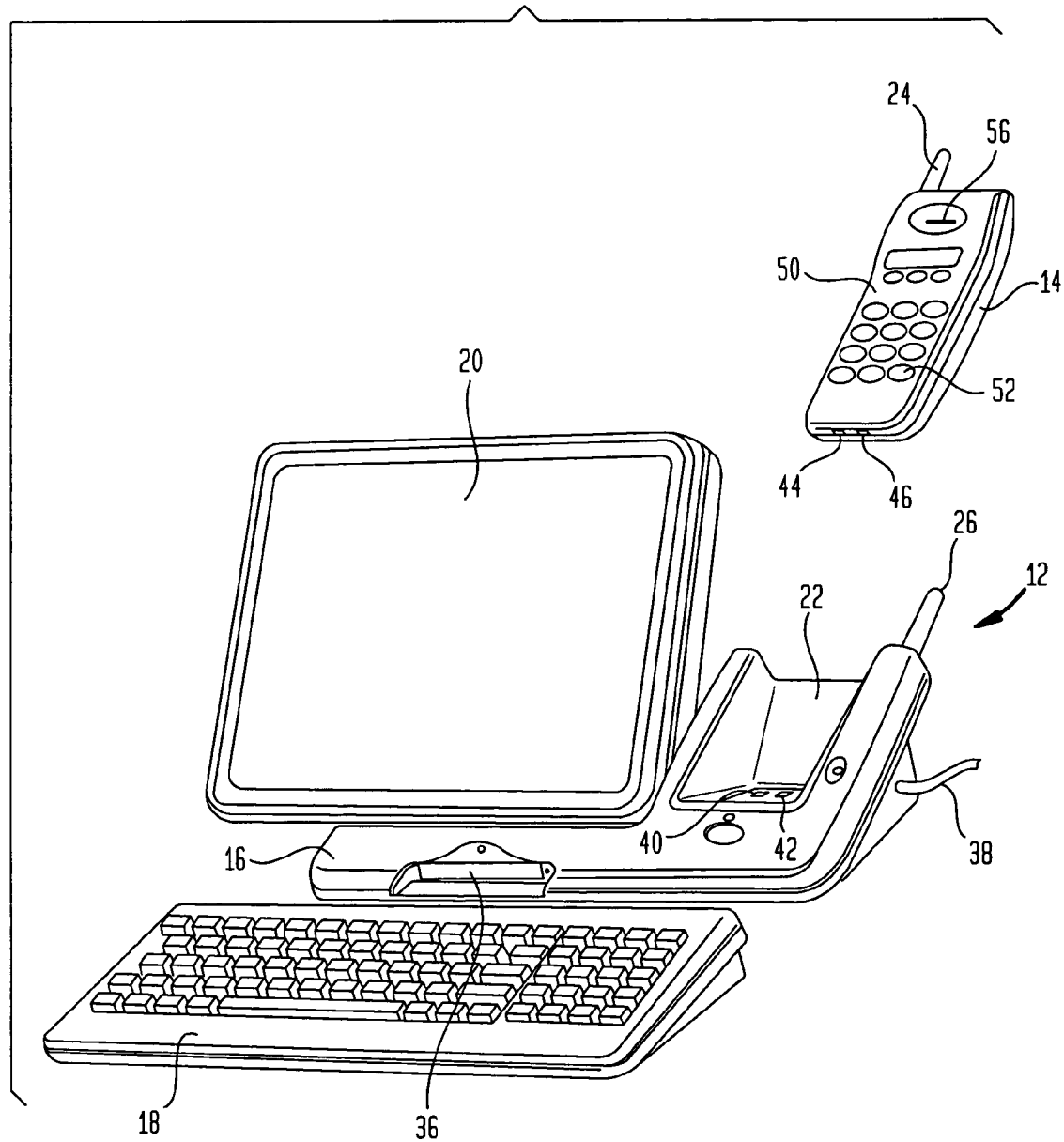
FIG. 1 is a perspective view of an integrated computer and mobile communication system constructed in accordance with a preferred embodiment of the present invention.

Referring now to the drawings, where like reference numerals designate like elements, there is shown in FIG. 1 an integrated computer and mobile communication system constructed in accordance with a preferred embodiment of the present invention. The system has a stand-alone base station 12 and a mobile handset 14. The base station 12 has a computer (CPU) 16, a keyboard 18 for inputting data to the CPU 16, and a monitor 20 for displaying information, graphics, etc. In addition, the base station 12 has a cradle 22 for receiving and supporting the handset 14. The cradle 22 may be integrated into the housing for the CPU 16, such that the handset 14 is located adjacent the monitor 20.

The handset 14 may contain a wireless telephone unit and a personal organizer unit, as discussed in more detail below. In addition, the handset 14 and the base station 12 may be provided with antennae 24, 26 for wireless communications. The base station 12 may contain a radio frequency module 28 (FIG. 4) for operating the base station antenna 26.

The CPU 16 may be, for example, a general purpose computer programmed with business and personal software. Among other things, the CPU 16 may be programmed to operate personal organizer software for maintaining calendars and schedules, providing reminders for meetings and other events, supporting notes and to-do lists for users, and the like. If desired, the CPU 16 may be connected to a computer network, such as an intra-office network or the Internet (not shown). A modem or other telephone line interface 30 may be provided for enabling network access, for example. The personal organizer software stored in the CPU 16 may be controlled, updated and/or maintained from a remote location via the network connection. The CPU 16 may have suitable memory devices 32, 34. The CPU 12 may have substantially more data memory and computer processing capability than the handset 14.

In a preferred embodiment of the invention, a suitable disc drive 36 (FIG. 1) may be provided for storing, retrieving and/or inputting data to the CPU 16. The preferred embodiment of the invention may also have a power cord 38 for connecting the CPU 16 to a conventional source of electrical power (not shown). The present invention should not be limited, however, to the specific features of the preferred embodiments shown and described in detail herein.

The keyboard 18 may be operatively connected to the CPU 16 in a known fashion. The keyboard 18 may be sized and located to facilitate the convenient and accurate input of data into the CPU 16. The illustrated keyboard 18 has a plurality of keys arrayed in a conventional fashion for entering data, such as appointments, reminders, notes, etc., which can be processed and/or displayed on the monitor 20. Because the keyboard 18 is full-sized, the process of entering data, such as appointments, etc., into the base station 12 may be more ergonomically convenient than entering data into a hand-held portable organizer which has a limited number of small keys. Thus, for example, the keyboard 18 makes it possible to use both hands simultaneously to input the desired information.

The monitor 20 may be conveniently located relative to the keyboard 18 to make it easy to confirm the accuracy of data (for example, appointment dates and times) input into the CPU 16. The monitor 20 may also be arranged to display a relatively large amount of data. If desired, a mouse (not shown) may be operatively connected to the monitor 20 in a known manner. The mouse may be used to input data into the CPU 16.

Figure 4:
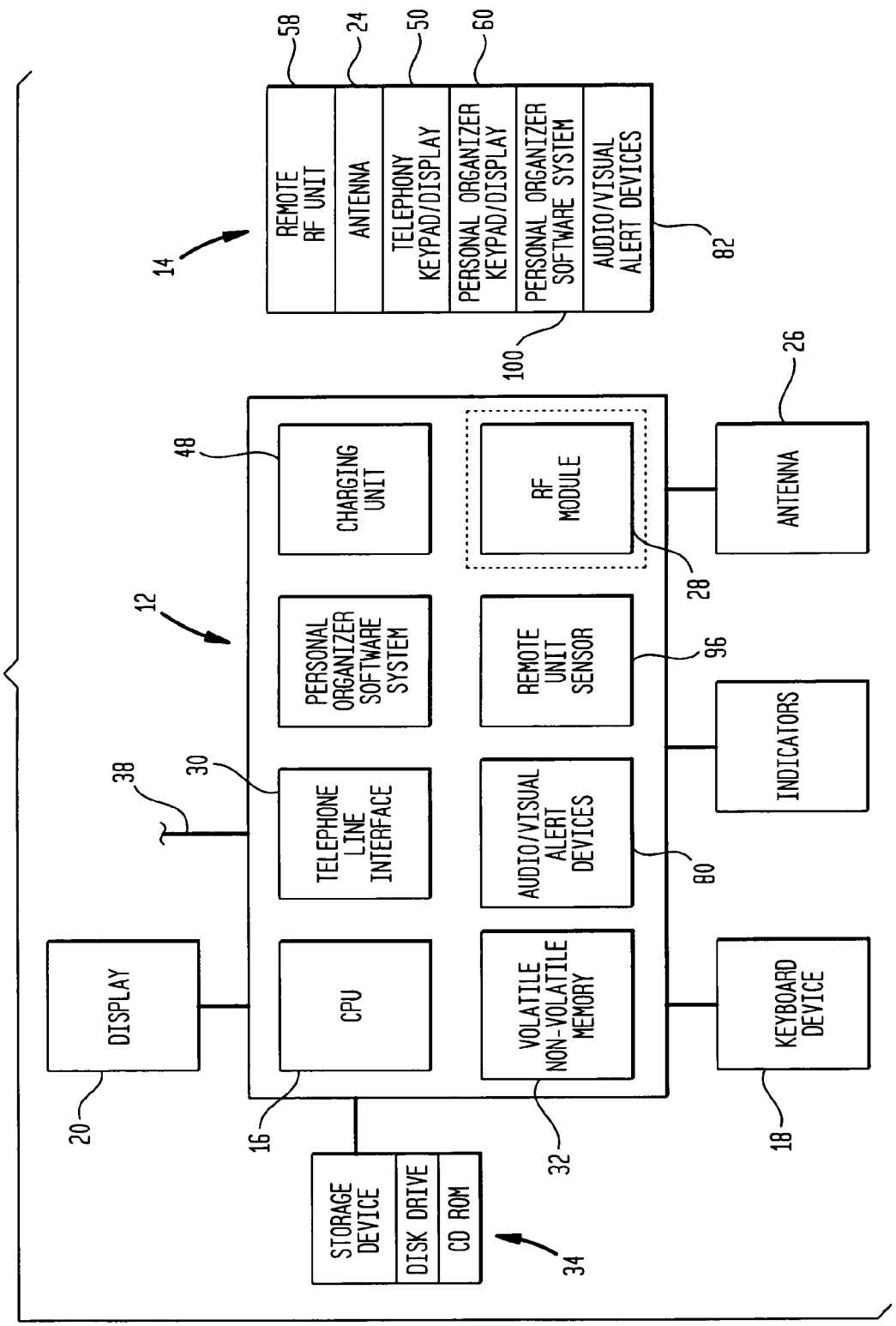
FIG. 4 is a schematic block diagram of the system of FIG. 1.

The cradle 22 and the handset 14 may have opposed electrical nodes 40, 42, 44, 46 for electrically connecting the handset 14 to the base station 12. In the preferred embodiment, the electrical nodes 40–46 are used to charge batteries (not shown) in the handset 14. The cradle nodes 40, 42 may be operatively connected to the power source 38 via a charging unit 48 (FIG. 4). Thus, when the handset 14 is resting in the cradle 22 (FIG. 1), the handset batteries may be charged and/or maintained in a fully charged condition via the nodes 40–46. In addition, the nodes 40–46 may form part of an electrical signal line for transferring data from the CPU 16 to the personal organizer unit of the handset 14, and vice versa, as described in more detail below.

As mentioned above, the handset 14 may be operated both as a wireless telephone and as a mobile personal organizer.

The telephone unit 50 is shown in FIG. 1. The telephone unit 50 has an alphanumeric keypad 52 for dialing telephone numbers, function keys 54, a microphone (not shown), and a speaker 56. The telephone unit 50 may be small enough to be held in the user's hand. Analog communication with a remote telephone or other communication device (not shown) is provided via the handset antenna 24 and a remote radio frequency unit 58 (FIG. 4). Electrical power for the telephone unit 50 is provided by the batteries which are recharged when the handset 14 is returned to the cradle 22.

Figure 3:
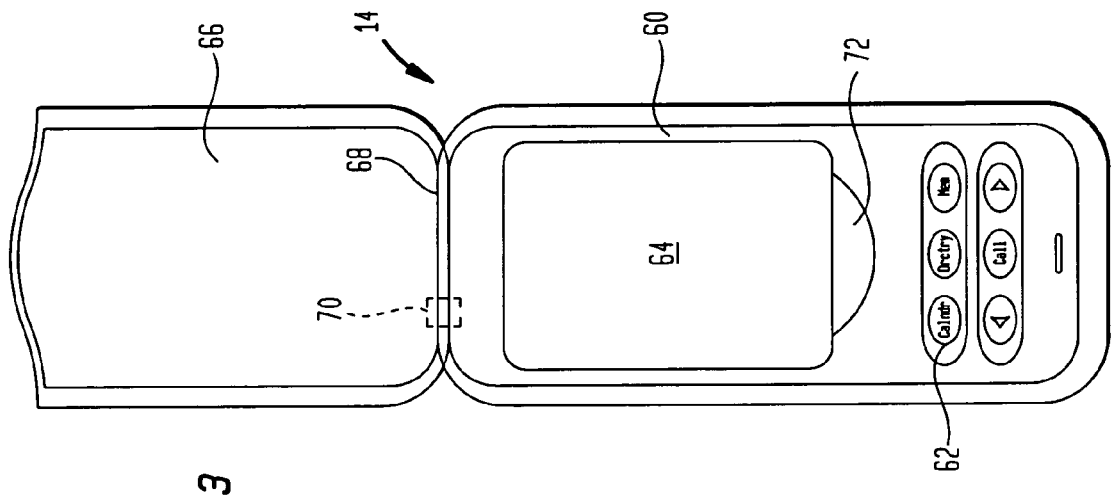
FIG. 3 is another rear view of the handset of FIG. 2, in an open position.
Figure 2:
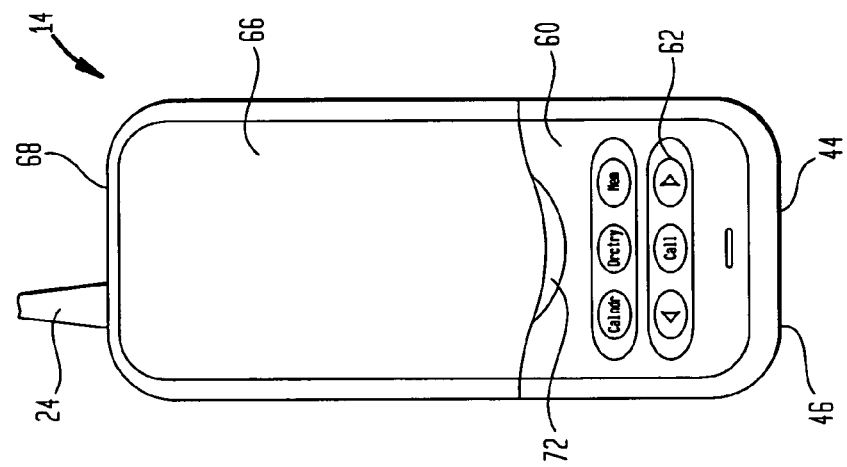
FIG. 2 is a rear view of the wireless handset of the system of FIG. 1.

The personal organizer unit 60 is shown in FIGS. 2 and 3. The personal organizer unit 60 and the telephone unit 50 are located on opposite sides of the handset 14. The personal organizer unit 60 has alphanumeric keys and function keys 62 for operating organizer programs stored in the handset 14. The function keys 62 may be used to access the software stored in the handset 14, recall messages, enter additional data, etc. The organizer unit 60 also has a display screen, which may be a light emitting diode (LED) screen 64, for displaying information generated by the organizer software.

Further, in the preferred embodiment, the organizer unit 60 is provided with a flip-top cover 66. The cover 66 protects the screen 64 from mechanical damage. The cover 66 may be connected to the end of the handset 14 by a suitable hinge 68. The cover 66 is shown in a closed position in FIG. 2 and in an open position in FIG. 3. A switch 70 may be provided for sensing when the cover 66 is in the open position. The switch 70 may be used to on-off control the data display screen 64. When the switch 70 is off (that is, when the flip top cover 66 is closed), the screen 64 may be disabled to preserve the handset batteries. In addition, the switch 70 may be operatively connected to the remote radio frequency unit 58 so that signals received by the antenna 24 are preferentially relayed to and from the telephone unit 50 or the organizer unit 60 depending on which unit 50, 60 is being used. A user may locate his or her finger in a recess 72 to lift the flip top cover 66 to the open position.

Figure 5:
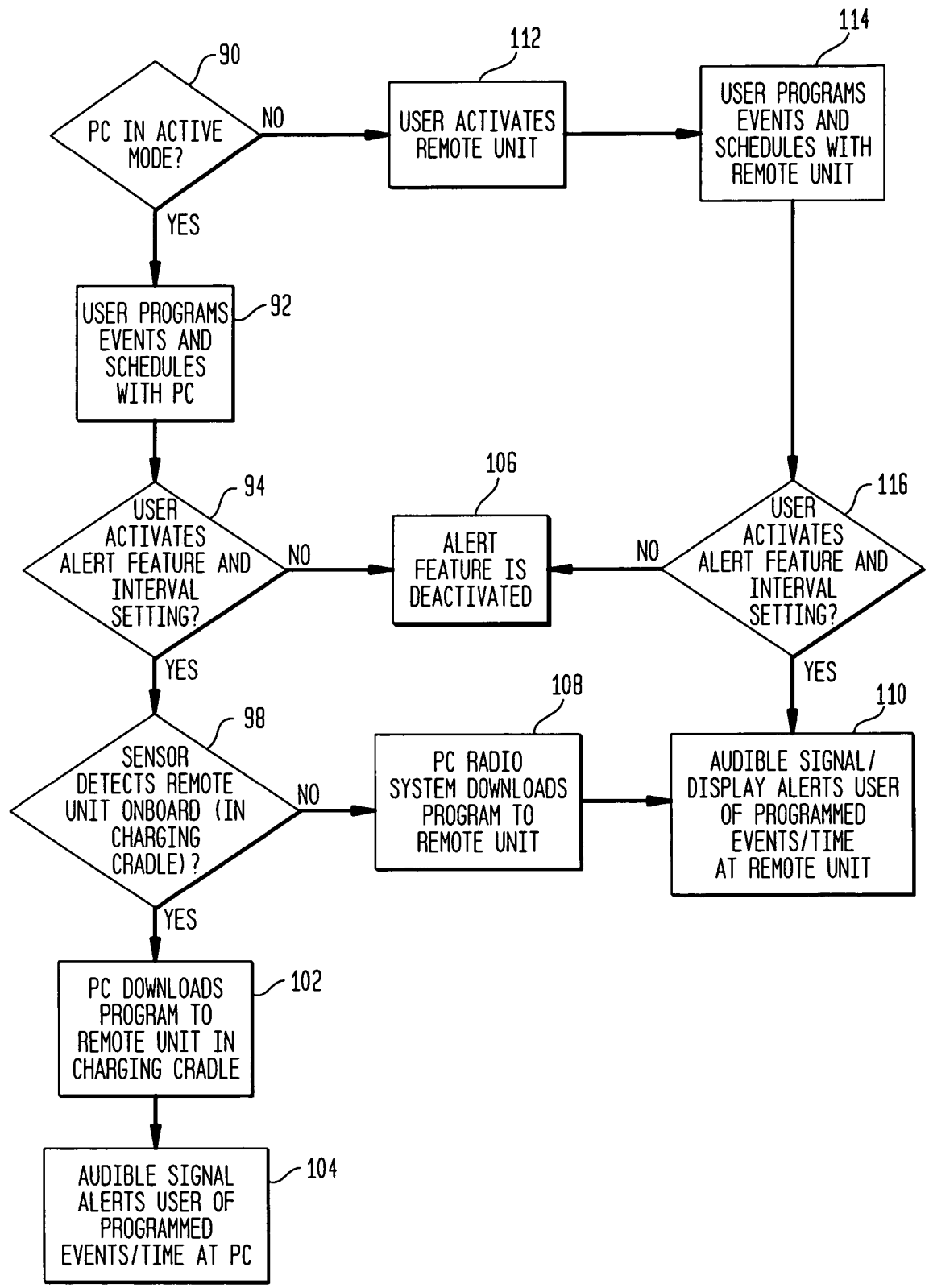
FIG. 5 is a flow chart of a method of operating the system of FIG. 1.

The illustrated system may have alert devices 80, 82 for generating audible or visual signals to inform the user of a scheduled event or the like at a predetermined time. The operation of the alert function will be described next in connection with a preferred embodiment of the invention. Referring now to FIG. 5, an operating system first determines whether the base station 12 is turned on (Step 90). If the base station 12 is in operational, the user can program events and schedules using the keyboard 18 to implement organizer software stored in the base station (Step 92).

While programming such events, the user may activate an alert function. Subsequently, the operating system determines whether the user has selected an alert feature and a time for generating an alert signal (Step 94). If the alert feature has been selected, a remote unit sensor 96 (FIG. 4) located within the cradle 22 determines whether the handset 14 is in the cradle 22 (FIG. 5, Step 98). If the handset 14 is in the cradle 22, the alert feature data representing the time for generating the signal, the nature of the signal, etc., is downloaded to a memory device 100 in the personal organizer unit 60 via the electrical nodes 40–46 (Step 102). Subsequently, at the predetermined time, assuming the handset 14 is still in the cradle 22, the CPU 16 provides an audible or visual signal to the user representative of the scheduled event (Step 104). It should be noted that the alert feature is optional. The alert devices 80, 82 may be deactivated (Step 106).

At Step 98, if the remote sensor unit 96 determines that the handset 14 has been removed from the cradle 22, then the digital alert function data (the program and/or the data representative of the time and nature of the scheduled event) may be downloaded to the personal organizer unit 60 via the RF antennae 24, 26 (Step 108). Then, at the occurrence of the scheduled event, the personal organizer unit 60 generates a representative audible alert signal (Step 110).

The personal organizer unit 60 may be used even when the CPU 16 is turned off (Step 112). The function keys 62 on the personal organizer unit 60 may be used to input alert data concerning events and schedules (Step 114). Then, when the predetermined event occurs, and when the remote alert device 82 is activated (Step 116), an audible signal is generated by the handset 14. The audible signal may be generated by the ringer for the telephone unit 50, for example (Step 110). If desired, the tone of the ringer (not shown) may be different for the alert signal than it is for the telephone unit 50 so that the user can distinguish between the two functions.

The cradle 22 may be designed such that the handset 14 fits into the cradle 22 at a vertical angle. The angled construction is such that the telephone unit 50 may be used as a speakerphone while the handset 14 is in the cradle 22. That is, the cradle 22 points the speaker 56 toward the user who may be seated in front of the keyboard 18. In addition, the cradle 22 positions the handset 14 so that the keypad 52 is readily accessible. While the telephone unit 50 is in the cradle 22, electrical power may be supplied by the power cord 38 and the electrical nodes 40–46, as mentioned above.

While a preferred embodiment of the invention has been described and illustrated, it should be apparent that many modifications can be made to the invention without departing from its spirit or scope. Accordingly, the invention is not limited by the foregoing description or drawings, but is only limited by the scope of the appended claims.

What is claimed as new and desired to be protected by Letters Patent of the United States is:

1. A computer and mobile communication handset system, said system comprising:
   a computer base station;
   a hand-held mobile device, separable from said computer base station, containing a wireless telephone unit and a personal organizer unit integrated into a same housing, said wireless telephone unit including a speaker and a microphone and said personal organizer unit including a first plurality of input keys and a first display screen;
   a first wireless, radio-frequency data transfer unit located in said computer base station for transferring data between said computer base station and said personal organizer unit of said mobile device; and
   a second wireless, radio-frequency data transfer unit located in said hand-held mobile device for transferring data between said personal organizer unit of said mobile device and said computer base station,
   wherein said wireless telephone unit includes a second plurality of input keys and a second display screen, and
   wherein said first plurality of keys and said first display screen of the personal organizer unit are located on a first outside surface of said housing, and said second plurality of input keys and said second display screen of the wireless telephone unit are located on a second outside surface of said housing, opposite to said first outside surface.

2. The system of claim 1, wherein said base station comprises a keyboard for entering organizer information and a monitor for displaying organizer information.

3. The system of claim 2, wherein said base station comprises a cradle for receiving said mobile device, said cradle being obliquely angled with respect to the base station such that when the mobile device is placed in the cradle, the speaker of the wireless telephone unit points towards a user seated in front of the computer base station and the second plurality of input keys are readily accessible to the user.

4. The system of claim 3, wherein said cradle includes nodes for charging said mobile device, and wherein said nodes transfer data to said personal organizer unit of said mobile device.

5. The system of claim 1, wherein said mobile device further comprises a hinged cover located over said first display screen.

6. The system of claim 5, further comprising a switch operatively associated with said hinged cover for on-off controlling said first display screen.

7. The system of claim 6, wherein an incoming telephone call to said mobile device is routed to one of said wireless telephone unit and said personal organizer unit based upon a state of said switch.

8. A mobile communication handset, said handset comprising:
  a personal organizer unit including a first plurality of input keys and a first display screen; and
  a wireless telephone unit integrated into a same housing with said personal organizer unit, said wireless telephone unit including a speaker and a microphone; and
  a wireless, radio-frequency data transfer unit located in said housing for transferring data between said personal organizer unit and a computer base station remote from said handset,
  wherein said wireless telephone unit includes a second plurality of input keys and a second display screen, and
  wherein said first plurality of input keys and said first display screen of the personal organizer unit are located on a first outside surface of said housing, and said second plurality of input keys and said second display screen of the wireless telephone unit are located on a second outside surface of said housing, opposite to said first outside surface.

9. The handset of claim 8, wherein said wireless, radio-frequency data transfer unit can receive an alert signal from the computer base station indicative of a time of a scheduled appointment, and wherein the personal organizer unit causes an alert to be issued in an audible or visual form in response to the alert signal.

10. The handset of claim 9, wherein the alert is issued in an audible form using the speaker of the wireless telephone unit.

11. The handset of claim 10, wherein the audible form is a first ring tone which is distinctive from a second ring tone associated with an incoming call to the wireless telephone unit.

12. A communications and personal organizer method, said method comprising the steps of:
  inputting organizer data into a computer base station;
  transmitting organizer data including personal scheduling information, via a wireless radio-frequency signal, from said computer base station to a personal organizer unit located in a mobile handset separable from said computer base station;
  using said personal organizer unit of said handset to view or manipulate scheduling information; and
  using a wireless telephone unit provided in said mobile handset for wireless telephone voice communication,
  wherein said personal organizer unit includes a first plurality of input keys and a first display screen, and said wireless telephone unit includes a second plurality of input keys and a second display screen, and
  wherein said first plurality of input keys and said first display screen of the personal organizer unit are located on a first outside surface of said mobile handset, and said second plurality of input keys and said second display screen of the wireless telephone unit are located on a second outside surface of said mobile handset, opposite to said first outside surface.

13. The method of claim 12, wherein said inputting step comprises the step of inputting organizer data via a keyboard connected to said base station.

14. The method of claim 13, wherein said inputting step also comprises transferring organizer data from the personal organizer unit to the computer base station.

15. The method of claim 12, wherein the step of transmitting organizer data to said personal organizer unit includes transferring the organizer data via the wireless radio-frequency while said handset is remote from said computer base station, and transferring the organizer data via terminals of a cradle connected to said computer base station while said mobile handset is located in said cradle.

16. The method of claim 15, further comprising the step of: recharging a battery of the mobile handset via the terminals, when the mobile handset is seated in the cradle.

17. The method of claim 15, further comprising the step of: operating the wireless telephone unit as a speakerphone, while the mobile handset is seated in the cradle.

18. The method of claim 15, wherein said cradle is obliquely angled with respect to the base station such that when the mobile handset is placed in the cradle, a speaker of the mobile handset points towards a user seated in front of the computer base station and the second plurality of input keys of the telephone unit are readily accessible to the user.

* * * * *